United States Patent

Nishiyama

(10) Patent No.: US 11,797,421 B2
(45) Date of Patent: Oct. 24, 2023

(54) SEMICONDUCTOR APPARATUS AND DEBUG SYSTEM

(71) Applicant: Rohm Co., Ltd., Kyoto (JP)

(72) Inventor: Takahiro Nishiyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 336 days.

(21) Appl. No.: 16/811,237

(22) Filed: Mar. 6, 2020

(65) Prior Publication Data

US 2020/0293429 A1    Sep. 17, 2020

(30) Foreign Application Priority Data

Mar. 12, 2019  (JP) .................. 2019-044877

(51) Int. Cl.
  *G06F 11/36* (2006.01)
  *G06F 11/22* (2006.01)
  (Continued)

(52) U.S. Cl.
  CPC ...... *G06F 11/3656* (2013.01); *G06F 9/30189* (2013.01); *G06F 9/3802* (2013.01);
  (Continued)

(58) Field of Classification Search
  None
  See application file for complete search history.

(56) References Cited

U.S. PATENT DOCUMENTS 6,052,774 A * 4/2000 Segars ................ G06F 11/3656
  714/39
6,182,247 B1 * 1/2001 Herrmann ...... G01R 31/318516
  714/39

(Continued)

FOREIGN PATENT DOCUMENTS

| JP | 2004-086447 | 3/2004 |
| JP | 5400443 | 11/2013 |
| WO | 2018139097 A1 * | 2/2018 |

OTHER PUBLICATIONS

Japanese Office Action in Japanese Appln. No. 2019-044877, dated Nov. 11, 2022, 4 pages (with Machine Translation).

(Continued)

*Primary Examiner* — Charles E Anya
(74) *Attorney, Agent, or Firm* — Fish & Richardson P.C.

(57) ABSTRACT

It is an object of the present invention to provide a debug system that accesses a semiconductor apparatus from the outside by a simple configuration at less overhead.

The present invention relates to a semiconductor apparatus and a debug system. A large scale integration (LSI 11) includes a central processing unit (CPU 20), a debug control portion (21), an internal bus (22), a storage portion (23, 24, 26) connected to the internal bus, and a selector (27). According to a select control signal (CNT) from the CPU, the selector selects either a CPU select state of transmitting a signal from the CPU to the internal bus, or a debugger select state of transmitting a signal from the debug control portion to the internal bus. In principle, the selector is set to the CPU select state. Upon receiving a predetermined command from an external device (12, 13) by the debug control portion, a signal corresponding to the predetermined command is sent from the debug control portion to the CPU, and the selector is temporarily set to the debugger select state, thereby accessing the internal bus through the debug control portion.

10 Claims, 7 Drawing Sheets

(51) Int. Cl.
*G06F 9/30* (2018.01)
*G06F 9/38* (2018.01)
*G06F 9/50* (2006.01)
*G06F 9/4401* (2018.01)
*G06F 9/448* (2018.01)
*G06F 9/54* (2006.01)

(52) U.S. Cl.
CPC .......... *G06F 9/4418* (2013.01); *G06F 9/4498* (2018.02); *G06F 9/5016* (2013.01); *G06F 9/546* (2013.01); *G06F 11/221* (2013.01)

(56) References Cited

U.S. PATENT DOCUMENTS

| | | | | |
|---|---|---|---|---|
| 6,324,684 | B1* | 11/2001 | Matt | G06F 11/3648 717/124 |
| 2002/0087918 | A1* | 7/2002 | Miura | G06F 11/3648 714/38.1 |
| 2010/0251022 | A1* | 9/2010 | Sato | G06F 11/362 714/E11.169 |
| 2014/0053036 | A1* | 2/2014 | Nixon | G01R 31/31705 714/E11.155 |
| 2014/0115566 | A1* | 4/2014 | Cao | G06F 11/3636 717/129 |
| 2018/0032282 | A1* | 2/2018 | Hahn | G06F 3/0604 |
| 2018/0253368 | A1* | 9/2018 | Villarreal | G06F 11/3664 |
| 2020/0210301 | A1* | 7/2020 | Nandan | G06F 11/2236 |

OTHER PUBLICATIONS

Japanese Search Report in Japanese Appln. No. 2019-044877, dated Nov. 11, 2022, 40 pages (with Machine Translation).

Chinese Office Action and Search Report in Chinese Appln. No. 202010171828.9, dated Mar. 18, 2023, 12 pages (with Office Action Summary Translation).

* cited by examiner

Read access and read operation performed by CPU

Read access and read operation performed by debug control portion

SEMICONDUCTOR APPARATUS AND DEBUG SYSTEM

BACKGROUND OF THE INVENTION

Field of the Invention

The present invention relates to a semiconductor apparatus and a debug system.

Description of the Prior Art

In a semiconductor apparatus having a CPU (Central Processing Unit) that executes programs, a debug system for supporting the debug operation of the programs is in most cases needed during the development of the programs to be executed.

In the debug operation, accessing a memory (a register, or a memory not categorized as a register, to be referred to as an internal resource below) in the semiconductor apparatus from the outside is expected during the operation of a program. In response to the expectation, a mass debug system is configured to access the internal resource from the outside of a semiconductor apparatus including LSI (Large Scale Integration) by using such as serial communication, and to perform necessary reading/writing.

At this point, the CPU is sometimes suspended (interrupted) upon executing a command at a specified address in order to access the internal resource. However, some apparatuses may then encounter an issue of a suspended CPU upon start of execution of a program. For example, in a motor control device, an issue of damage of a device may be caused by uncontrollable rotation of the motor if a CPU is suspended, and thus any CPU suspension shall be avoided once the execution of a program has started. Therefore, a debug system applied to the device above has a requirement of being capable of accessing an internal resource without causing any CPU suspension.

PRIOR ART DOCUMENTS

Patent Publication

[Patent document 1] Japan Patent No. 5400443
[Patent document 2] Japan Patent Publication No. 2004-86447

SUMMARY OF THE INVENTION

Problems to be Solved by the Invention

For the purpose of debugging by a circuit that is provided in a semiconductor apparatus but does not at all affect the operation of the semiconductor apparatus, providing such circuit to be as small as possible is desired.

Furthermore, given that debug operation may be performed by a program without causing any CPU suspension, in order to minimize influences on the program, accessing an internal resource from the outside at the cost of extremely small overhead (clock overhead) would be more ideal.

In the debug system of patent document 1, a DMA (Direct Memory Access) controller is needed in a debug system provided in a semiconductor apparatus, and thus the scale of the circuit is enlarged (referring to FIG. 4 of patent document 1). Furthermore, a bus arbitration circuit for arbitrating a memory access of a CPU and a memory access of a debugger needs to be provided in the semiconductor apparatus (referring to FIG. 7 of patent document 1), which similarly causes an enlargement in the scale of the circuit. In addition, overhead (clock overhead) for acquiring the right of access is increased. That is to say, in the debug system of the patent document 1, if an interrupt process is entered, the CPU branches to an interrupt-exclusive address and operates under the control of an interrupt-exclusive debug program, such that the number of clocks (that is, overhead) required for the debug operation is increased.

In a data system of patent document 2, in order to access an internal resource from the outside, a constituting component equivalent to a DMA controller originally provided in a semiconductor apparatus (a microcomputer) is used. In other words, the method of patent document 2 is not applicable to a semiconductor apparatus without a DMA controller. Furthermore, in the method of patent document 2, in order to use a debug (simulation) program to implement access of an internal resource, an RAM (Random Access Memory) exclusive to the debug program (an embedded RAM) is needed inside the semiconductor apparatus. As a result, the scale of the debug circuit provided in the semiconductor apparatus is enlarged, and the number of clocks (clock overhead) required for the debug operation is increased.

It is an object of the present invention to provide a semiconductor apparatus and a debug system implementing external access by a simple configuration at less overhead.

Technical Means for Solving the Problem

A semiconductor apparatus of the present invention is configured as below (first configuration). The semiconductor apparatus includes a bus, a storage portion connected to the bus, a selector connected to the bus, a processing portion executing a program and accessing the bus through the selector, and a debug control portion configured to mutually communicate with an external device and accessing the bus through the selector. The selector selects either a first select state or a second select state according to a select control signal from the processing portion, wherein the first select state is transmitting a first signal from the processing portion to the internal bus, and the second select state is transmitting a second signal from the debug control portion to the internal bus. When the selector is in the first select state, upon receiving a predetermined command from the external device by the debug control portion, the selector is temporarily switched with collaboration of the debug control system and the processing portion to the second select state. When the selector is set to the second select state, the debug control portion accesses the bus through the selector in response to the predetermined command.

A semiconductor apparatus of the present invention may also be configured as below (second configuration). The semiconductor apparatus according to the first configuration suspends execution of the program if the selector is set to the second select state.

A semiconductor apparatus of the present invention may also be configured as below (third configuration). In the semiconductor apparatus according to the first or second configuration, upon start of execution of the program, apart from temporarily setting the selector to the second select state in response to receiving of the predetermined command, the selector is set to the first select state.

A semiconductor apparatus of the present invention may also be configured as below (fourth configuration). In the semiconductor apparatus according to any one of the first to third configurations, the debug control portion outputs a predetermined access start signal to the processing portion in response to the receiving of the predetermined command, and the processing portion switches the selector from the first select state to the second select state in response to input of the access start signal. Upon end of the access corresponding to the predetermined command and performed by the debug control portion, the debug control portion outputs a predetermined access end signal to the processing portion, and the processing portion restores the selector from the second select state to the first select state in response to input of the access end signal.

A semiconductor apparatus of the present invention may also be configured as below (fifth configuration). In the semiconductor apparatus according to the fourth configuration, the processing portion includes a state machine that controls an execution state of the program. While the state machine in a fetch state of performing fetch and execution of a command forming the program, the state machine changes to a break state of suspending the fetch and execution of the command upon receiving the input of the access start signal by the processing portion, and the state machine restores to the fetch state in response to the input of the access end signal received by the processing portion. Further, the state machine in the break state controls the selector to be in the second select state.

A semiconductor apparatus of the present invention may also be configured as below (sixth configuration). In the semiconductor apparatus according any one of the first to fifth configurations, when the selector is in the first select state, upon receiving a read command as the predetermined command by the debug control portion, the selector is temporarily switched with the collaboration of the debug control portion and the processing portion to the second select state. When the selector is set to the second select state, the debug control portion performs a read access corresponding to the read command on the bus through the selector, and transmits read data acquired by the read access from the storage portion to the external device.

A semiconductor apparatus of the present invention may also be configured as below (seventh configuration). In the semiconductor apparatus according to the sixth configuration, the storage portion includes a plurality of storage regions allocated with a plurality of addresses, and any of the plurality of addresses is specified by the read command. In the read access corresponding to the read command, the debug control portion accesses the bus through the selector to acquire from the storage portion data in the storage region at the address specified by the read command, as read data, and sends the acquired read data to the external device.

A semiconductor apparatus of the present invention may also be configured as below (eighth configuration). In the semiconductor apparatus according to any one of the first to fifth configurations, when the selector is in the first select state, upon receiving a write command as the predetermined command by the debug control portion, the selector is temporarily switched with the collaboration of the debug control portion and the processing portion to the second select state. When the selector is set to the second select state, the debug control portion performs a write access corresponding to the write command on the bus through the selector. Data corresponding to the write command is written to the storage portion by the write access.

A semiconductor apparatus of the present invention may also be configured as below (ninth configuration). In the semiconductor apparatus according to the eighth configuration, the storage portion includes a plurality of storage regions allocated with a plurality of addresses, and any of the plurality of addresses and write data are specified by the write command. In the write access corresponding to the write command, the debug control portion accesses the bus through the selector to write the write data to the storage region at the address specified by the write command.

A debug system of the present invention is configured as below (tenth configuration). That is, the debug system includes the semiconductor apparatus according to any one of the first to ninth configurations, and an external device connected to the semiconductor apparatus and capable of sending the predetermined command to the debug control portion of the semiconductor apparatus.

Effects of the Invention

According to the present invention, a semiconductor apparatus and a debug system implementing external access by a simple configuration at less overhead are provided.

DETAILED DESCRIPTION OF THE EMBODIMENTS

Examples of embodiments of the present invention are specifically described with reference to the accompanying drawings below. In the reference drawings, the same part is represented by the same denotation, and repeated description of the same part is in principle omitted. Furthermore, in the description, for brevity, information, signals, physical quantities, names of components or portions corresponding to signs or symbols (denoted for reference) representing information, signals, physical quantities, components or portions can be omitted or abbreviated. For example, a read enable signal denoted as "RE" (referring to FIG. 1) is sometimes recited as a read enable signal RE, and is sometimes abbreviated as a signal RE, which however refer to the same matter.

First Embodiment

Figure 1:
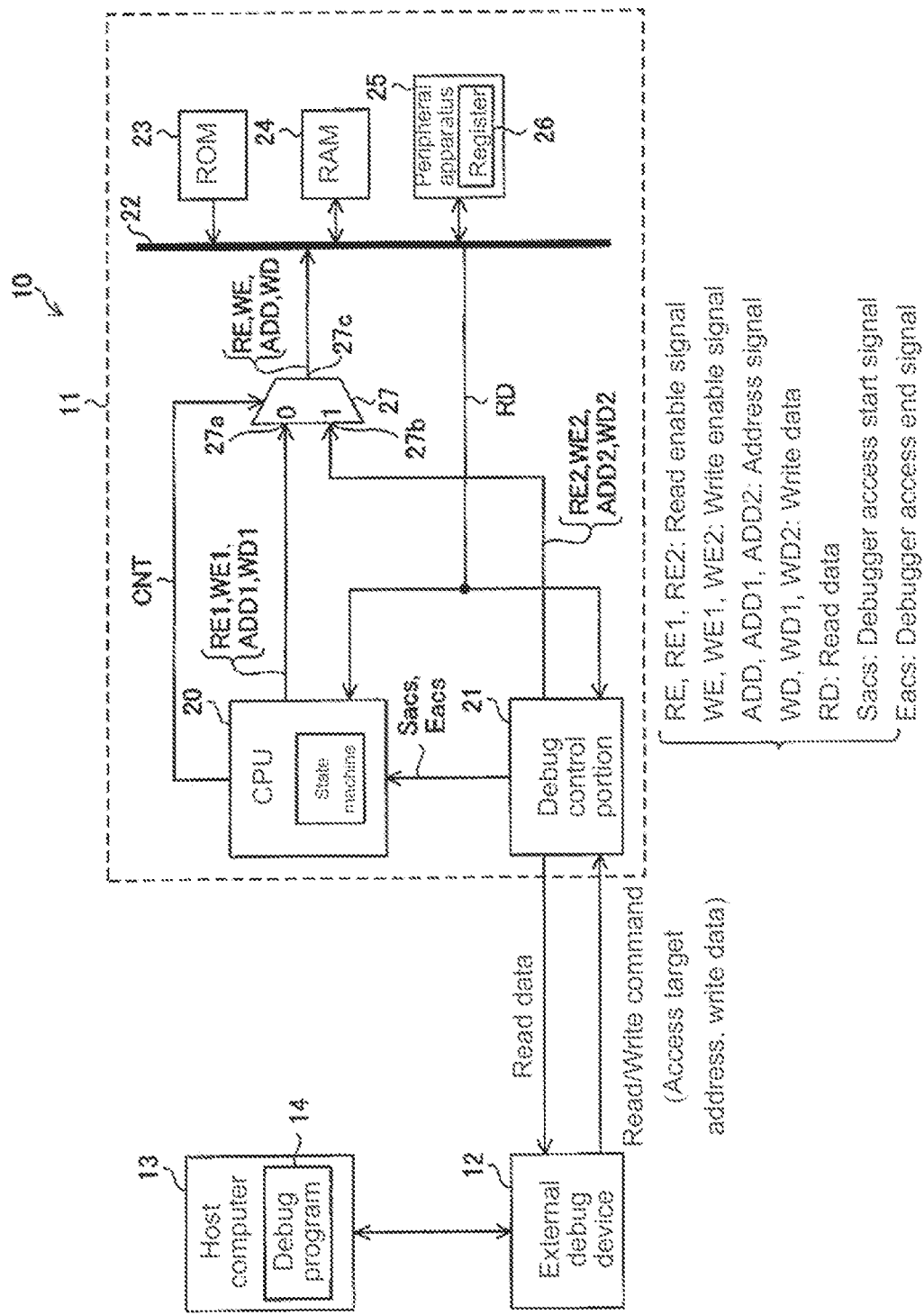
FIG. 1 is a brief configuration diagram of a debug system according to a first embodiment of the present invention.

A first embodiment of the present invention is described below. FIG. 1 shows a brief configuration diagram of a debug system 10 according to the first embodiment of the present invention. The debug system includes an LSI 11 having a built-in CPU, an external debug device 12, and a host computer 13 (hereinafter referred to as "host PC 13").

The LSI 11 serving as a semiconductor apparatus includes a CPU 20, a debug control portion 21, an internal bus 22 and a selector 27, and further includes more than one ROM (Read Only Memory), more than one RAM, and more than one peripheral apparatus serving as more than one peripheral circuit, as constituting components connected to the internal bus 22. In FIG. 1, a ROM 23 serving as one ROM included in the more than one ROM, a RAM 24 serving as one RAM included in the more than one RAM, and a peripheral apparatus 25 serving as one peripheral apparatus included in the more than one peripheral apparatus are depicted. In the description below, the ROM 23, the RAM 24 and the peripheral apparatus 25 serve as examples of the ROM, RAM and peripheral apparatus. A register 26 is disposed in the peripheral apparatus 25.

The CPU 20 executes a program stored in a program memory (not shown) provided in the LSI 11. The program memory may also be disposed in the CPU 20. The CPU 20 access the internal bus 22 through the selector 27 as required when executing the program, and is capable of reading data stored in the ROM 23, the RAM 24 or the register 26, or writing data to the RAM 24 or the register 26. In the description below, the term "a program" refers to a program to be executed or a program is currently executed by the CPU 20.

The external debug device 12 is connected to the debug control portion 21 through a terminal (not shown) provided in the LSI 11, and functions as an interface between the debug control portion 21 and the host PC 13. The external debug device 12 and the host PC 13 are connected to each other in form of being capable of mutual communication. Debug software 14 is executed in the host PC 13. A user of the debug system 10 may perform a debug operation of the program executed by the CPU 20 by operating the host PC 13 currently executing the debug software 14.

Figure 2:
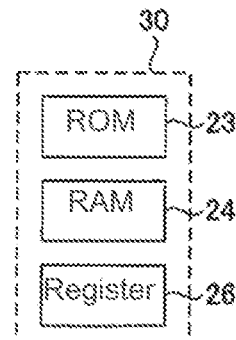
FIG. 2 is a diagram of a storage portion provided in an LSI.

Referring to FIG. 2, a storage circuit provided in the LSI 11 and including the ROM 23, the RAM 24 and the register 26 is referred to as a storage portion 30 for illustration purposes below. The storage portion 30 includes a plurality of storage regions capable of storing data of a predetermined size. Predetermined address spaces are defined in the storage portion 30, and inherent addresses are assigned to the storage regions forming the storage portion 30.

The selector 27 has a first input portion 27a, a second input portion 27b and an output portion 27c. The first input portion 27a is connected to the CPU 20, the second input portion 27b is connected to the debug control portion 21, and the output portion 27c is connected to the internal bus 22. Associated details are given below.

The CPU 20 and the debug control portion 21 are respectively capable or outputting a read enable signal, a write enable signal, an address signal and write data. More specifically, the read enable signal, the write enable signal the address signal and the write data outputted from the CPU 20 are respectively referred to as a read enable signal RE1, a write enable signal WE1, an address signal ADD1 and write data WD1; the read enable signal, the write enable signal, the address signal and the write data outputted from the debug control portion 21 are referred to as a read enable signal RE2, a write enable signal WE2, an address signal ADD2 and write data WD2. Write data, in other words, may be considered as signals representing the write data. For the sake of representation convenience, sometimes the write data WD1 and WD2 are recited as signals WD1 and WD2 (the same applies to the write data WD).

The first input portion 27a is connected to a wire, which is provided between the CPU 20 and the selector 27 and transmits the signals RE1, WE1, ADD1 and WD1, and receives input of the signals RE1, WE1, ADD1 and WD1 from the CPU 20. The second input portion 27b is connected to a wire, which is provided between the debug control portion 21 and the selector 27 and transmits the signals RE2, WE2, ADD2 and WD2, and receives input of the signals RE2, WE2, ADD2 and WD2 from the debug control portion 21.

A select control signal CNT from the CPU 20 is supplied to the selector 27. The selector 27 selectively connects either the first input portion 27a or the second input portion 27b to the output portion 27c according to the select control signal CNT. The select control signal CNT is a 1-bit signal in a value "1" or "0". The selector 27 selects a CPU select state if the value of the select control signal CNT is "0", and the selector 27 selects a debugger select state of the value of the select control signal CNT is "1". In the description below, the CPU select state of the selector 27 is sometimes simply referred to as a "CPU select state", and the debugger select state of the selector 27 is sometimes simply referred to as a "debugger select state". Furthermore, the term "debugger" is a general term of a portion for the debug operation, and may be explained as including all or a part of the debug control portion 21, the external debug device 12 and the host PC 13.

In the CPU select state, the first input portion 27a is connected to the output portion 27c. As a result, the wire transmitting the signals RE1, WE1, ADD1 and WD1 is connected to the internal bus 22 through the output portion 27c to transmit these signals RE1, WE1, ADD1 and WD1 to the internal bus 22. In the debugger select state, the second input portion 27b is connected to the output portion 27c. As a result, the wire transmitting the signals RE2, WE2, ADD2 and WD2 is connected to the internal bus 22 through the output portion 27c to transmit these signals RE2, WE2, ADD2 and WD2 to the internal bus 22.

More specifically, the read enable signal, the write enable signal, the address signal and the write data outputted from the output portion 27c are respectively referred to as the read enable signal RE, the write enable signal WE, the address signal ADD and the write data WD. Furthermore, the write data (WD, WD1, WD2) is data outputted only when the following write access is performed.

In the CPU select state, the first input portion 27a is connected to the output portion 27c, and thus the read enable signal RE1, the write enable signal WE1, the address signal ADD1 and the write data WD1 from the CPU 20, as the read enable signal RE, the write enable signal WE, the address signal ADD and the write address WD, are outputted from the output portion 27c to the internal bus 22. In the debugger select state, the second input portion 27b is connected to the output portion 27c, and thus the read enable signal RE2, the write enable signal WE2, the address signal ADD2 and the write data WD2 from the debug control portion 21, as the read enable signal RE, the write enable signal WE, the address signal ADD and the write address WD, are outputted from the output portion 27c to the internal bus 22.

As such, the CPU 20 may access the internal bus 22 when the selector 27 is in the CPU select state, and the debug control portion 21 may access the internal bus 22 when the selector 27 is in the debugger select state. Accessing the internal bus 22 includes a read access and a write access. In other words, a read access or a write access to the internal bus 22 is a read access or a write access to the storage portion 30 through the internal bus 22. Accessing the RAM 24 and the register 26 is either one of a read access and a write access; however, accessing the ROM 23 is limited to only a read access.

The storage portion 30 (e.g., the RAM 24) performs, upon receiving the read access from the CPU 20 or the debug control portion 21, a read operation of outputting the required read data RD to the internal bus 22, and performs, upon receiving the write access from the CPU 20 or the debug control portion 21, a write operation of storing data corresponding to the write data WD and sent from the internal bus 22. Read data may also be considered as signals representing the read data. For the sake of representation convenience, the read data RD may also be recited as a signal RD.

The internal bus 22 includes a plurality of wires for individually sending the signals RE, WE, ADD, RD and WD (that is, the signals RE, WE and ADD, and the data RD and WD). Among the wires forming the internal bus 22, the wire for transmitting the read data RD is individually connected to the CPU 20 and the debug control portion 21. Thus, when the read data RD is outputted from the storage portion 30 to the internal bus 22 in response to the read access, the CPU 20 and the debug control portion 21 may acquire the read data RD.

Herein, the read enable signal (RE, RE1, RE2) is a 1-bit signal in a value "1" or "0". The read enable signal (RE, RE1, RE2) in a value "1" functions as a signal permitting the read operation, and the read enable signal (RE, RE1, RE2) in a value "0" functions as a signal prohibiting the read operation. Further, the write enable signal (WE, WE1, WE2) is a 1-bit signal in a value "1" or "0". The write enable signal (WE, WE1, WE2) in a value "1" functions as a signal permitting the write operation, and the write enable signal (WE, WE1, WE2) in a value "0" functions as a signal prohibiting the write operation. The address signal (ADD, ADD1, ADD2) refers to a signal specifying the address of any storage region in the storage portion 30, and has a bit count corresponding to the size of the address space defined in the storage portion 30. The read data (RD) is data stored in any storage region in the storage portion 30 and read out from that storage region. The write data (WD, WD1, WD2) is data to be written to any storage region in the storage portion 30. The bit count of each of the read data and the write data may be in any value (e.g., 8 bits).

Further, the debug control portion 21 may output a debugger access start signal Sacs and a debugger access end signal Eacs to the CPU 20. Associated details of these signals are described below.

The host PC 13 (in other words, the debug software 14) may issue a predetermined command according to the operation of the user of the debug system 10 on the host PC 13, wherein the issued predetermined command is sent to the debug control portion 21 through the external debug device 12.

The predetermined command includes a read command for requesting the debug control portion 21 to perform a read access, and a write command for requesting the debug control portion 21 to perform a write access, wherein the read command specifies an access target address, and the write command specifies an access target address and write data. It may be understood as, when the read command is sent from the external debug device 12 to the debug control portion 21, a signal indicating the access target address is added in the read command and sent. Similarly, it may be understood as, when the write command is sent from the external debug device 12 to the debug control portion 21, a signal indicating the access target address and a signal indicating the write data are added in the write command and sent.

The access target address is any address in the address spaces of the storage portion 30. The access target address specified by the read command is an address of a target of which a read access is performed by the debug control portion 21, the access target address specified by the write command is an address of a target of which a write access is performed by the debug control portion 21, and the write data specified by the write command indicates data to be written to the access target address.

Upon issuing of the read command, the debugger select state of the selector 27 is temporarily achieved with collaboration of the debug control portion 21 and the CPU 20. In the debugger select state, the read access corresponding to the read command is performed on the internal bus 22 by the debug control portion 21, so as to acquire stored data of the storage region at the access target address as the read data RD. The acquired read data RD is sent from the debug control portion 21 to the external debug device 12, and is forwarded to the host PC 13 through the external debug device 12.

Upon issuing of the write command, the debugger select state of the selector 27 is temporarily achieved with the collaboration of the debug control portion 21 and the CPU 20. In the debugger select state, the write access corresponding to the write command is performed on the internal bus 22 by the debug control portion 21, so as to write write data specified by the write command to the storage region at the access target address.

Figure 3A:
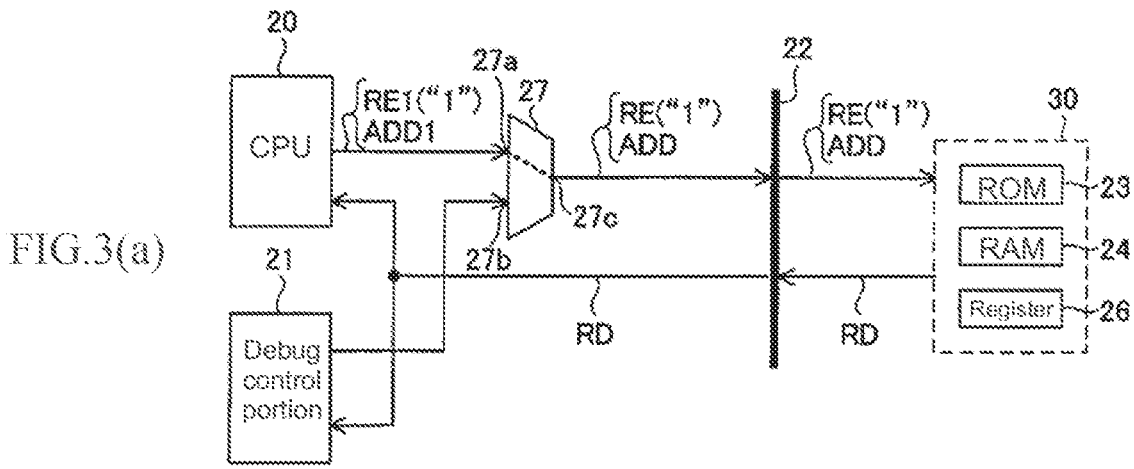
FIGS. 3(a) and (b) are diagrams illustrating a read access and a read operation according to the first embodiment of the present invention.

Referring to FIGS. 3(a) and (b), the read access and the read operation are further described. In the CPU select state, the CPU 20 is able to perform the read access by the program executed thereby; in the debugger select state, the debug control portion 21 is able to perform the read access according to the received read command.

As shown in FIG. 3(a), in the read access in the CPU select state, the CPU 20 outputs the read enable signal RE1 in a value "1" and the address signal ADD1 specifying any of the plurality of addresses defined in the storage portion 30 as the read enable signal RE and the address signal ADD, to the internal bus 22 through the selector 27, for the storage portion 30 to perform the read operation.

Figure 3B:
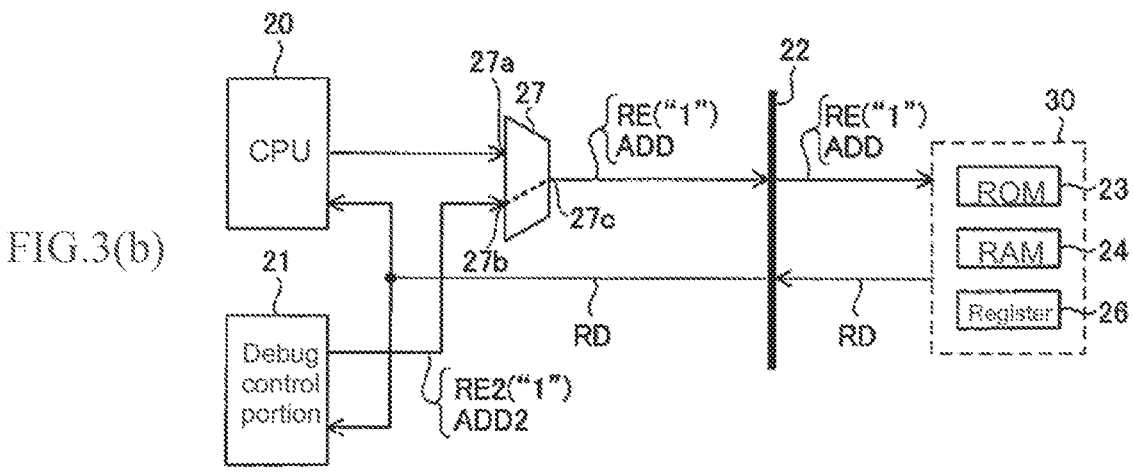

As shown in FIG. 3(b), in the read access in the debugger select state, the debug control portion 21 outputs the read enable signal RE2 in a value "1" and the address signal ADD2 specifying any of the plurality of addresses defined in the storage portion 30, as the read enable signal RE and the address signal ADD, to the internal bus 22 through the selector 27, for the storage portion 30 to perform the read operation. The address specified by the address signal ADD2 is the same as the access target address specified by the read command.

In the read operation in response to the read access, the storage portion 30 (e.g., the RAM 24) reads the stored data in the storage region at the address specified by the address signal ADD inputted from the CPU 20 or the debug control portion 21 through the internal bus 22, and outputs the read data as the read data RD to the internal bus 22. The read data RD outputted to the internal bus 22 by the read operation is inputted to the CPU 20 and the debug control portion 21 through the internal bus 22 and the wire provided between the CPU 20 and the debug control portion 21.

Figure 4A:
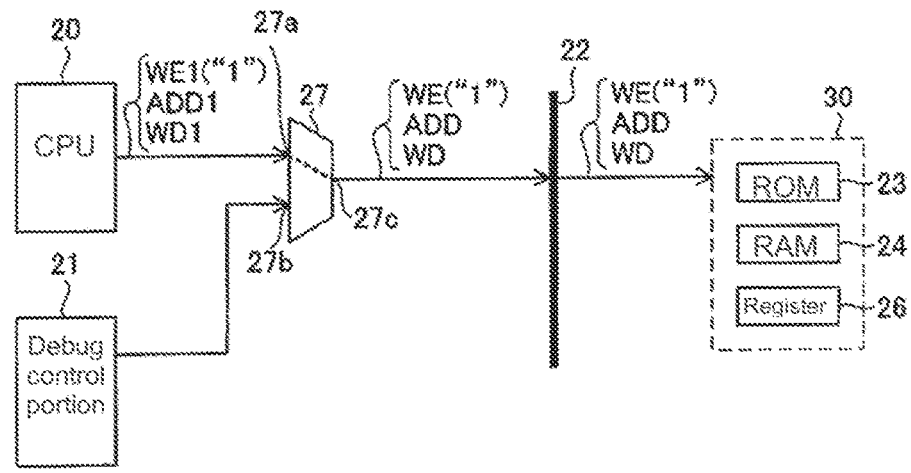
FIGS. 4(a) and (b) are diagrams illustrating a write access and a write operation according to the first embodiment of the present invention.

The write access and the write operation are further described with reference to FIGS. 4(a) and (b). In the CPU select state, the CPU 20 is able to perform the write access by the program executed thereby; in the debugger select state, the debug control portion 21 is able to perform the write access according to the received write command.

Figure 4B:
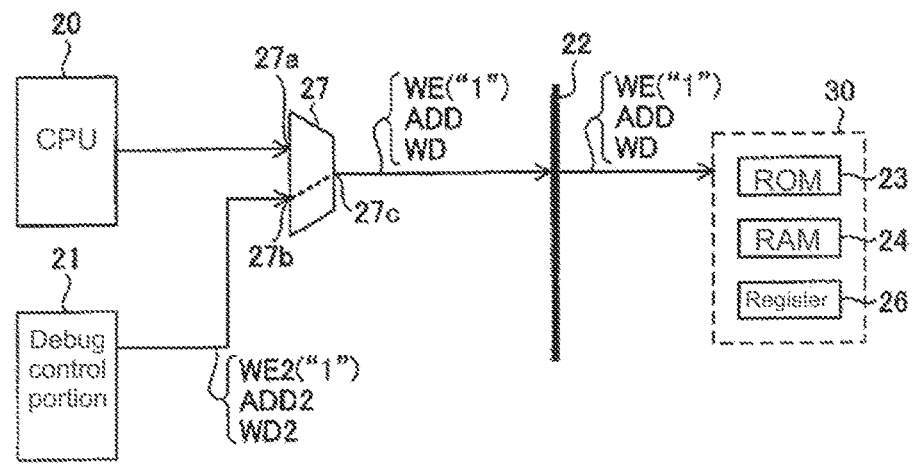

As shown in FIG. 4(*a*), in the write access in the CPU select state, the CPU 20 outputs the write enable signal WE1 in a value "1", the address signal ADD1 specifying any of the plurality of addresses defined in the storage portion 30, and the write data WD to be written to the storage region at the address specified by the address signal ADD1, as the write enable signal WE, the address signal ADD and the write data WD, to the internal bus 22 through the selector 27, for the storage portion 30 to perform the write operation.

As shown in FIG. 4(*b*), in the write access in the debugger select state, the debug control portion 21 outputs the write enable signal WE2 in a value "1", the address signal ADD2 specifying any of the plurality of addresses defined in the storage portion 30, and the write data WD2 to be written to the storage region at the address specified by the address signal ADD2, as the write enable signal WE, the address signal ADD and the write data WD, to the internal bus 22 through the selector 27, for the storage portion 30 to perform the write operation. The address specified by the address signal ADD2 is the same as the access target address specified by the write command. The write data WD2 is the same as the write data specified by the write command.

In the write operation in response to the write access, the storage portion 30 (e.g., the RAM 24) stores data corresponding to the write data WD from the CPU 20 or the debug control portion 21 to the storage region at the address specified by the address signal ADD inputted from the CPU 20 or the debug control portion 21 through the internal bus 22. Sometimes the stored data in the corresponding storage region after the write operation is the same as the write data WD; however, sometimes for specifications reasons, the data based on the write data WD may be different from the write data WD.

The CPU 20 in principle sets the state of the selector 27 to be the CPU select state, and sets the state of the selector 27 to be in the debugger select state only when it is required to access the internal bus 22 through the debug control portion 21. Details of control for the behaviors above are to be described in the relationship of the operation of a state machine included in the CPU 20 below.

Figure 5:
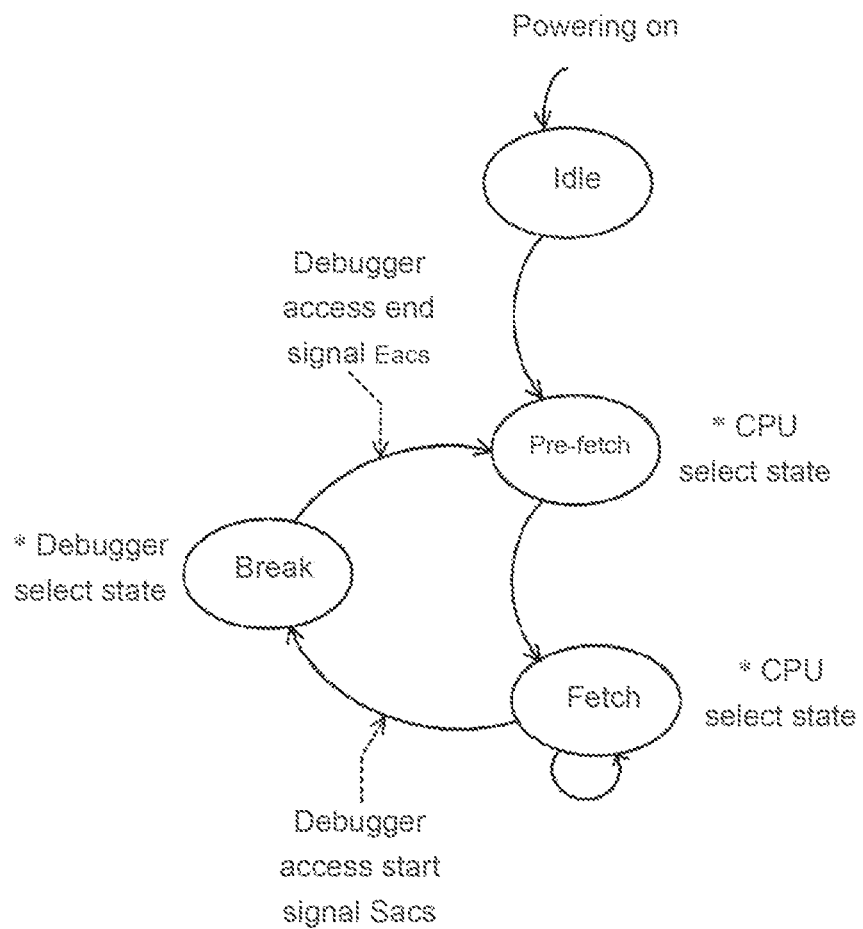
FIG. 5 is a diagram of state changes of a state machine according to the first embodiment of the present invention.

FIG. 5 shows a diagram of state changes of a state machine. The state machine controls an execution state of the program in the CPU 20. The state machine adopts any of the four following states—an idle state, a pre-fetch state, a fetch state and a break state. An entity of the state machine is a register storing a value that indicates in which of the four states the execution state of the program in the CPU 20 is. The idle state is a state before the CPU 20 executes the program, and is the initial state of the state machine. When power is initially supplied to the LSI 11, the state machine first becomes the idle state.

Upon powering the LSI 11, predetermined initialization operation is executed in the LSI 11. Once preparation for starting the execution of the program is complete, the state machine changes from the idle state to the pre-fetch state, and then changes to the fetch state. The pre-fetch state is a state before just about to change to the fetch state. To change from the idle state or the break state to the fetch state, the state machine undergoes the pre-fetch state and then changes to the fetch state. The pre-fetch state is a state for starting or restarting an access to the program memory.

The program stored in the program memory includes a command (command code) group to be executed by the CPU 20. Required commands are sequentially read from the program memory by the CPU 20 and the operation clock of the CPU 20 synchronously, and the sequentially read commands are sequentially executed through such as decoding to then execute the program. The operation of reading and acquiring a required command from the program memory is referred to as fetch. The fetch state is a state of performing fetch and execution of a command forming the program. Before changing to fetch state from the idle state or break state in which no fetch is performed, an interval of starting or restarting the access to the program memory is within the time of one clock, and the state machine at that interval is in the pre-fetch state. Thus, after changing from the idle state or break state to the pre-fetch state, the state machine changes from the pre-fetch state to the fetch state after the time of one clock has elapsed. The time of one clock is equivalent to the duration of one clock cycle of the operation clock of the CPU 20.

In the pre-fetch state and the fetch state, the selector 27 is set to the CPU select state. That is to say, the CPU 20 outputs the select control signal CNT in a value "0" in the pre-fetch state and the fetch state to set the state of the selector 27 to the CPU select state. The reason for such is that, after the execution of the program starts in the CPU 20 in response to the change to the fetch state, given that the debugger access start signal Sacs from the debug control portion 21 is not received by the CPU 20, the state machine is kept in the fetch state. Furthermore, even in the idle state, the selector 27 is also set to the CPU select state (however, it may also be set to the debugger select state).

The program is executed by repeated fetch and execution of the command in the fetch state. Since the selector 27 is set to the CPU select state in the fetch state, the CPU 20 may freely access the internal bus 22 according to the program executed thereby, so as to enable the storage portion 30 to perform the required read operation or write operation.

Figure 6:
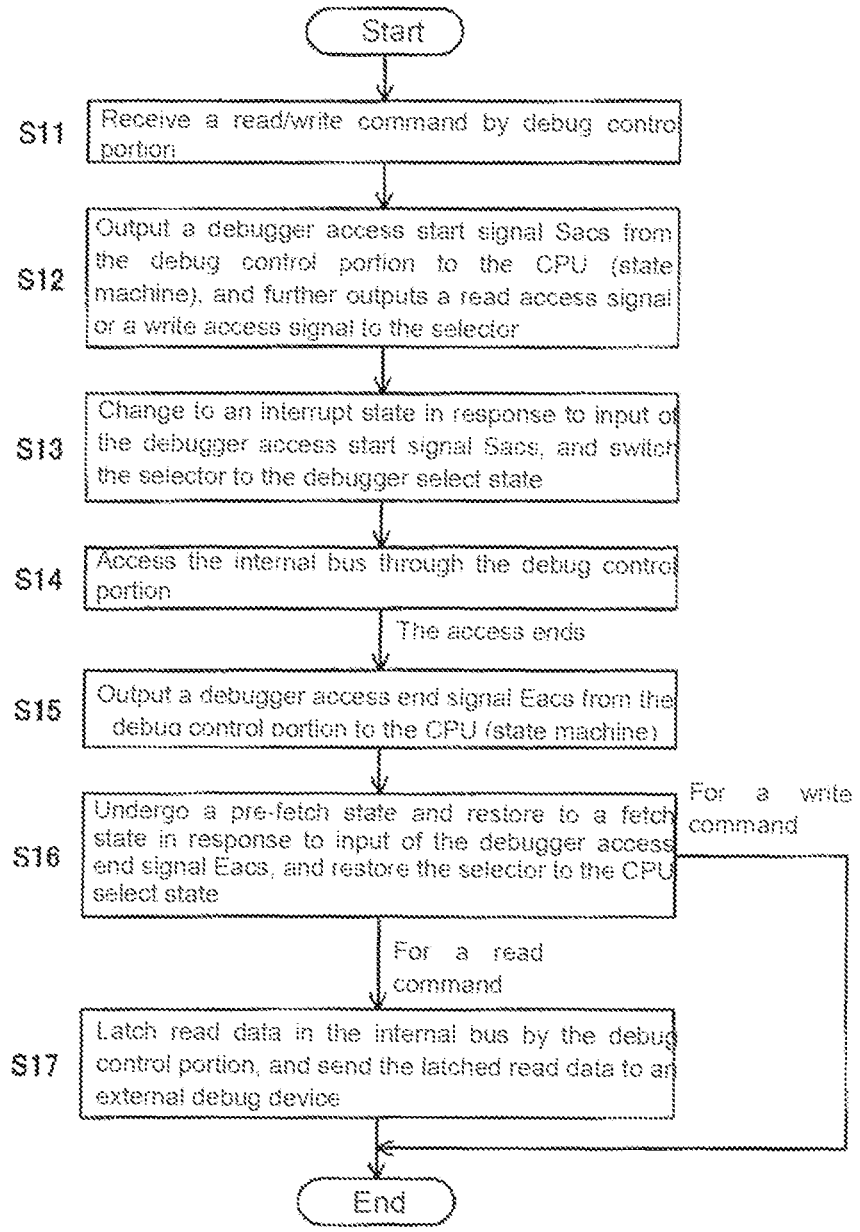
FIG. 6 is a flowchart of the operation of an LSI after the change to a fetch state according to the first embodiment of the present invention.

FIG. 6 shows a flowchart of the operation of the LSI 11 after the change to the fetch state. Referring to FIG. 5 and FIG. 6, details of the operation of the LSI 11 after the change to the fetch state are described below.

After start of the LSI 11, the debug control portion 21 monitors whether a command from the external debug device 12 is received. If the read command or write command is received from the external debug device 12 in step S11, in step S12, the debug control portion 21 outputs a predetermined debugger access start signal Sacs to the CPU 20 (in other words, to the state machine) in response to the receiving, and further outputs a read access signal or a write access signal to the selector 27. The debugger access start signal Sacs may be considered as a signal of notification to start accessing the internal bus 22 through the debug control portion 21, or be considered as a signal of a request to transfer access permission of the internal bus 22 to the debug control portion 21.

If the read command is received in step S11, the read access signal is outputted to the selector 27 in step S12. The read access signal includes the read enable signal RE2 in a value "1" and the address signal ADD2 described above. The address specified by the address signal ADD2 is the same as the access target address specified by the read command.

If the write command is received in step S11, the write access signal is outputted to the selector 27 in step S12. The write access signal includes the write enable signal WE2 in a value "1", the address signal ADD2 and the write data WD2 described above. The address specified by the address signal ADD2 is the same as the access target address specified by the write command. The write data WD2 is the same as the write data specified by the write command.

A timing for outputting the read access signal or the write access signal to the selector 27 may be synchronous or asynchronous with the timing for outputting the debugger access start signal Sacs, given that the output of the read access signal or write access signal to the selector 27 is performed while the actual access to the internal bus 22 is performed through the debug control portion 21.

Furthermore, in the debug operation, it is beneficial to access the storage portion 30 while the CPU 20 executes the program. Thus, the read command or the write command is basically issued when the state machine is in the fetch state. Therefore, it is considered that the debugger access start signal Sacs is outputted when the state machine is in the fetch state.

Once input of the debugger access start signal Sacs is received by the CPU 20, the state machine immediately changes from the fetch state to the break state in response to the input in step S13, and the select control signal CNT in a value "1" is outputted from the CPU 20 to the selector 27.

The execution of the program is suspended in the break state (more specifically, fetch and execution of the command are suspended). The select control signal CNT in a value "1" functions as a signal indicating that the state machine is in the break state, and the selector 27 is switched from the CPU select state to the debugger select state upon receiving the select control signal CNT in a value "1". That is to say, in the break state, the selector 27 is set to the debugger select state. In other words, the state machine is in the break state when the selector 27 is set to the debugger select state, and so the execution of the program is suspended (more specifically, fetch and execution of the command are suspended).

In step S14 following step S13, the debug control portion 21 accesses the internal bus 22 as required through the selector 27 (in other words, accessing the storage portion 30 through the selector 27 and the internal bus 22). The access herein refers to outputting the foregoing read access signal to the internal bus 22 through the selector 27 if the read command is received in step S11, or outputting the foregoing write access signal to the internal bus 22 through the selector 27 if the write command is received in step S11. The read access signal or the write access signal outputted to the internal bus 22 is transmitted to the storage portion 30. The read operation is then performed in the storage portion 30 according to the input of the read access signal. Alternatively, the write operation is performed in the storage portion 30 according to the input of the write access signal.

Once the access in step S14 ends, a predetermined debugger access end signal Eacs is outputted to the CPU 20 (in other words, to the state machine) from the debug control portion 21 in step S15.

Upon receiving the input of the debugger access end signal Eacs by the CPU 20, in step S16, the state machine immediately changes from the break state to the pre-fetch state in response to the input, and then changes to the fetch state (that is to say, changing to the pre-fetch state from the break state and then restoring to the fetch state). Furthermore, when the state machine changes from the break state to the pre-fetch state in response to the input of the debugger access end signal Eacs, the CPU 20 switches the value of the select control signal CNT from "1" to "0" so as to restore the selector 27 to the CPU select state. By restoring to the fetch state, the execution of the program that is temporarily interrupted due to the change in state is restarted.

If the command received in step S11 is the write command, a series of operations accompanied with the received write command end in step S16 (the processing of the following step S17 is not performed).

If the command received in step S11 is the read command, the operation of step S17 is performed. In step S17, the debug control portion 21 outputs the read data RD to be latched (stored) to the internal bus 22 from the storage portion 30 in response to the access (read access) in step S14, and sends the latched read data RD to the external debug device 12. The read data RD is forwarded from the external debug device 12 to the host PC 13, and is displayed on such as a display image of the host PC 13 for use of the debug operation.

The debug control portion 21 includes a latch circuit (not shown) for performing the latching. FIG. 6 shows whether the processing of step S17 is performed after step S16. However, the timing of the latching may be any as desired given that it is within the interval in which the read data RD from the storage portion 30 appears in the internal bus 22 in response to the access (read access) in step S14. The sending of the read data RD to the external debug device 12 in step S17 may be performed at any timing after the latching. For example, after the state machine restores to the fetch state in step S16 and the execution of the program is restarted, the read data RD may be sent to the external debug device 12 in parallel to the execution of the program.

As described previously, the debug system 10 in principles sets the selector 27 to the CPU select state, and temporarily switches the selector 27 with the collaboration of the debug control portion 21 and the CPU 20 to the debugger select state (steps S11 to S13) if the predetermined command (read or write command) is received by the debug control portion 21. Then, when the selector 27 is set to the debugger select state, the debug control portion 21 accesses the internal bus 22 through the selector 27 in response to the predetermined command (in other words, accessing the storage portion 30 through the selector 27 and the internal bus 22) (step S14).

According the configuration and operation above, the overhead needed for the debugger to access the storage portion 30 becomes extremely little without involving a bus arbitration circuit or a DMA controller (hence only a minimal scale circuit is additionally needed). The time of one clock is sufficient for changing to the break state, and the time of one clock is similarly sufficient for restoring from the break state. Although the time of one clock is added to the time needed for accessing the storage portion 30, such as a RAM built in an LSI is usually capable of performing an access by the time of one clock. Thus, the access to the storage portion 30 by a debugger may be achieved at the overhead of only three clocks, which almost does not affect the normal operation of the CPU 20.

Upon start of the execution of the program (that is, upon changing to the fetch state through the pre-fetch state from the idle state), apart from temporarily setting the state of the selector 27 to the debugger select state in response to the received read command or write command, the selector 27 is also set to the CPU select state. Thus, no other obstacle is incurred except for the interval of the described overhead for the access to the internal bus 22 by the CPU 20 along with the execution of the program.

It may be understood from the description above that, if the read command is received, the debug control portion 21 performs the read access corresponding to the read command on the internal bus 22 through the selector 27 by the output of the read access signal in the debugger select state (in other words, the read access corresponding to the read command is performed on the storage portion 30 through the selector 27 and the internal bus 22). More specifically, in the read access, the debug control portion 21 accesses internal bus 22 through the selector 27 to acquire from the storage portion 30 data in the storage region at the address (the access target address) specified by the read command (in other words, performed on the storage portion 30 through the selector 27 and the internal bus 22), as the read data RD, and sends the acquired read data RD to the external debug device 12.

On the other hand, if the write command is received, the debug control portion 21 performs the write access corresponding to the write command on the internal bus 22 through the selector 27 by the output of the write access signal in the debugger select state (in other words, the write access corresponding to the write command is performed on the storage portion 30 through the selector 27 and the internal bus 22). More specifically, in the write access, the debug control portion 21 accesses the internal bus 22 through the selector 27 to write the write data specified by the write command to the storage region at the address (the access target address) specified by the write access (in other words, performed on the storage portion 30 through the selector 27 and the internal bus 22).

Figure 7:
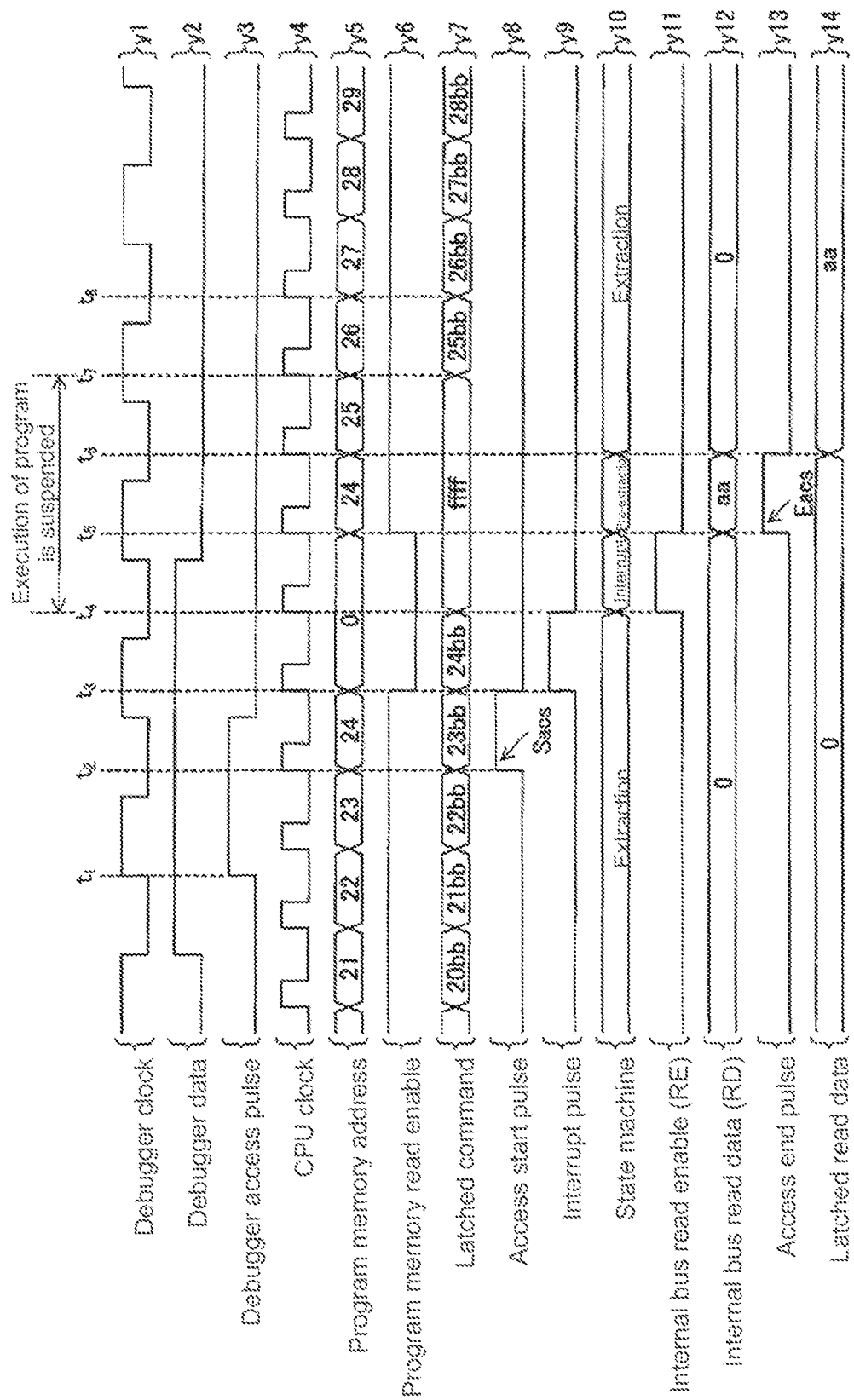
FIG. 7 is a timing diagram of an LSI in response to receiving of a read command according to the first embodiment of the present invention.

FIG. 7 shows a timing diagram of the LSI 11 in response to receiving of a write command. In FIG. 7, the waveform y1 represents the waveform of a debugger clock, and the waveform y4 represents the waveform of a CPU clock. The CPU clock refers to the operation clock of the CPU 20. The debugger clock refers to a part of the debug control portion 21 and the operation clock of the external debug device 12. The remaining part of the debug control portion 21 operates synchronously with the operation clock of the CPU 20. The debugger clock is, for example, generated by a clock generation circuit (not shown) in the external debug device 12, and is provided to the debug control portion 21 by a communication wire between the external debug device 12 and the debug control portion 21. The CPU clock and the debugger clock are asynchronous. Regardless of whether the frequencies of the CPU clock and the debugger clock are the same or different, the frequency of the debugger clock is usually less than the frequency of the CPU clock.

Any clock including the debugger clock and the CPU clock is a square wave signal that periodically alternates between a high level and a low level. For any clock or signal, a high level has a higher potential compared to a low level. In any signal, switching from a low level to a high level is referred to as a rising edge and the timing of switching from a low level to a high level is referred to a rising edge timing. Herein, a part of the debug control portion 21 operating according to the debugger clock introduces an input signal thereto at the rising edge of the debugger clock, changes a level of a signal to be outputted, or changes the state thereof, the remaining part of the debug control portion 21 operating according to the CPU clock and the CPU 20 (including the state machine) introduce an input signal thereto at the rising edge of the CPU clock, change a level of a signal to be outputted, or change the state thereof. As the time passes, timings t1, t2, t3, t4, t5, t6, t7 and t8 sequentially arrive. The rising edge of the CPU clock is generated at each of the timings t2, t3, t4, t5, t6, t7 and t8. The periods between the timings t2 and t3, the timings t3 and t4, the timings t4 and t5, the timings t5 and t6, the timings t6 and t7, and the timings t7 and t8 are all equal to one clock cycle of the CPU clock.

In FIG. 7, the waveform y2 represents debugger data, and illustratively represents a signal sent from the external debug device 12 to the debug control portion 21. The read command or the write command is used as the debugger data forwarded to the debug control portion 21. In the example in FIG. 7, at the timing t1 or before the timing t1, the issuing and sending of the read command from the external debug device 12 to the debug control portion 21 have ended; at the timing t1, the debug control portion 21 generates therein a debugger access pulse represented by the waveform y3. The timing t1 is a timing of a rising edge in the debugger clock. The debugger access pulse is a pulse signal in synchronization with the debugger clock. In the debug control portion 21, the debugger access pulse is synchronized by the CPU clock to generate an access start pulse represented by the waveform y8. The access start pulse is generated between the timings t2 and t3. The access start pulse serves as the foregoing debugger access start signal Sacs and is outputted from the debug control portion 21 to the CPU 20.

In response to the input of the access start pulse (the signal Sacs), at the timing t3, the CPU 20 switches a program memory read enable signal represented by the waveform y6 from a high level to a low level, and generates an interrupt pulse for changing the state machine to the break state.

A program counter is provided in the CPU 20. The program counter counts and specifies an address (to be referred to as a program memory address) of the program memory, wherein said address stores the command that is to be extracted next. Only when the program memory read enable signal is at a high level, the program counter is used to synchronize the program memory address with the CPU clock and to sequentially perform update according to the period of the CPU clock. In FIG. 7, "y5" represents a time sequential change of the program memory addresses. The program memory read enable signal is set to a low level only between the timings t3 and t5, and the program memory address does not have a value with a significance (in FIG. 7, "0" is a value representing the lack of such significance) between the timings t3 and t5.

In FIG. 7, "y10" represents a time sequential change of the state of the state machine. When the state machine is in the fetch state, the program memory address is accessed, and the command stored in the program memory address that becomes the access target is extracted and latched in the next clock (that is, after the time of one clock in the CPU clock has elapsed). That is to say, for example, if the program memory address between the timings t2 and t3 is "24", the command (corresponding to the command code "24bb" in FIG. 7) stored in the storage region at the program memory address "24" is extracted at the rising edge of the CPU clock at the timing t3, and the extracted command is latched between the timings t3 and t4. Up to the timing t4, the state machine is in the fetch state and currently performs fetch and execution of the command.

The interrupt pulse represented by the waveform y9 is provided to the state machine, and taking the timing t4 as a boundary, the state machine changes from the fetch state to the break state. In the break state, as previously described, the selector 27 is set to the debugger select state. The debug control portion 21 outputs the read access signal to the selector 27 by transmitting the read access signal corresponding to the read command to the internal bus 22 through the selector 27 between the timings t4 and t5. The waveform y11 represents the read enable signal RE applied to the internal bus 22. Between the timings t4 and t5, the read enable signal RE becomes "1" (the address signal ADD is not shown in FIG. 7) according to the read access signal from the debug control portion 21.

Upon end of the read access performed by the debug control portion 21, the debug control portion 21 generates an access end pulse represented by the waveform y13. The access end pulse is generated between the timings t5 and t6. The access end pulse serves as the foregoing debugger access end signal Eacs, and is outputted from the debug control portion 21 to the CPU 20.

In response to the input of the access end pulse (the signal Eacs), at the timing t5, the program memory read enable signal is switched from a low level to a high level by the CPU 20, and taking the timing t5 as a boundary, the state machine changes from the break state to the pre-fetch state. Upon restoring the program memory read enable signal to a high level, the foregoing update operation of the program memory address is re-started.

After the change from the break state to the pre-fetch state and the time of one clock has elapsed, at the timing t6, taking the timing t6 as a boundary, the state machine changes from the pre-fetch state to the fetch state. Between the timings t6 and t7, the program counter specifies the program memory address (corresponding to the program memory address "25" in FIG. 7) storing the command to be extracted next (corresponding to the command code "25bb" in FIG. 7) with respect to the command latched between the timings t3 and t4 (corresponding to the command code "24bb" in FIG. 7), and the command to be extracted next (corresponding to the command code "25bb" in FIG. 7) is actually extracted and latched between the timings t7 and t8 serving as the next clock cycle. In FIG. 7, "y7" represents a time sequential change of the command (command code) having been extracted and latched wherein an interval with "ffff" shown (that is, an interval between the timings t4 and t7) represents an execution suspension interval of the program (a suspension interval of fetch and execution of the command). As described above, the access to the storage portion 30 by the debug control potion 21 may be achieved at the cost of overhead of three clocks.

In FIG. 7, "y12" represents the read data RD appearing in the internal bus 22, and the read data RD appearing in the internal bus 22 is latched by the debug control portion 21 at the timing t6. "y14" represents the latched read data RD. The latched read data RD is sent from the debug control portion 21 to the external debug device 12 after the timing t6.

The timing diagram of the LSI 11 in response to receiving of the read command is depicted, and the timing diagram of the LSI 11 in response to receiving of the write command is also the same. However, if the write command is received, a write access signal is outputted from the debug control portion 21 to the internal bus 22 through the selector 27 between the timings t4 and t5. It should be understood that, outputting of the read data RD from the storage portion 30 to the internal bus 22 and latching of the read data RD performed by the debug control portion 21 are not performed.

Second Embodiment

The second embodiment of the present invention is described below. In the second embodiment, several application techniques and variation techniques suitable for the first embodiment are explained. The second embodiment includes the embodiments EX2_1 to EX2_5 below.

Embodiment EX2_1

Figure 8:
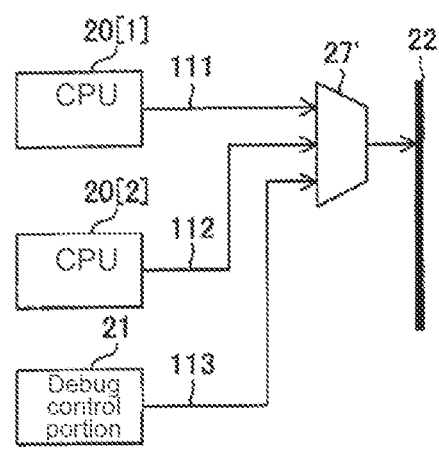
FIG. 8 is a diagram illustrating the relationship of two CPUs, a debug control portion, a selector and an internal bus according to a second embodiment of the present invention.

The embodiment EX2_1 is described below. A plurality of CPUs 20 may also be provided in the LSI 11. In this case, an arbitration circuit (not shown) adjusting an access timing of each CPU 20 is provided in the LSI 11, such that the internal bus 22 is not accessed simultaneously by more than two CPUs 20. For specific description as shown in FIG. 8, considering that a CPU 20[1] and a CPU 20[2] are provided as the plurality of CPUs 20, and a selector 27' is provided in substitution for the selector 27 above as a constituting component of the arbitration circuit. The selector 27' selectively connects any of a signal line 111 transmitting the access signal from the CPU 20[1], a signal line 112 transmitting the access signal from the CPU 20[2], and a signal line 113 transmitting the access signal from the debug control portion 21 to the internal bus 22. Each of the signal lines 111 to 113 includes a plurality of wires. The access signal from the CPU 20[1], the access signal from the CPU 20[2] and the access signal from the debug control portion 21 respectively include the read enable signal, the write enable signal and the address signal, and further includes write data if the write access is performed.

Before the read command or the write command from the external debug device 12 is received, the arbitration circuit controls the selector 27' by means of connecting the signal line 111 or 112 to the internal bus 22. Upon receiving the read command or the write command from the external debug device 12, the debug control portion 21 outputs the debugger access start signal Sacs to each CPU 20, and each CPU 20 changes each state machine to the break state in response to the input of the debugger access start signal Sacs. Once the state machines of all the CPUs 20 have changed to the break state, the arbitration circuit then controls the selector 27' by means of connecting the signal line 113 to the internal bus 22.

Upon end of the access performed by the debug control portion 21, the debugger access end signal Eacs is outputted from the debug control portion 21 to each CPU 20 and the arbitration circuit, and each CPU 20 changes each state machine from the break state to the pre-fetch state and then to the fetch state in response to the input of the debugger access end signal Eacs. Once the output of the debugger access end signal Eacs from the debug control portion 21 is received, the arbitration circuit then restores the selector 27' back to the state of connecting the signal line 111 or 112 to the internal bus 22. The same applies to cases where the internal bus 22 is accessed by more than three CPUs 20.

Embodiment EX2_2

The embodiment EX2_2 is described below. If the method described in the first embodiment is utilized, a register (to be referred to as a CPU internal register) provided in the CPU 20 may also be accessed by the debugger.

Figure 9:
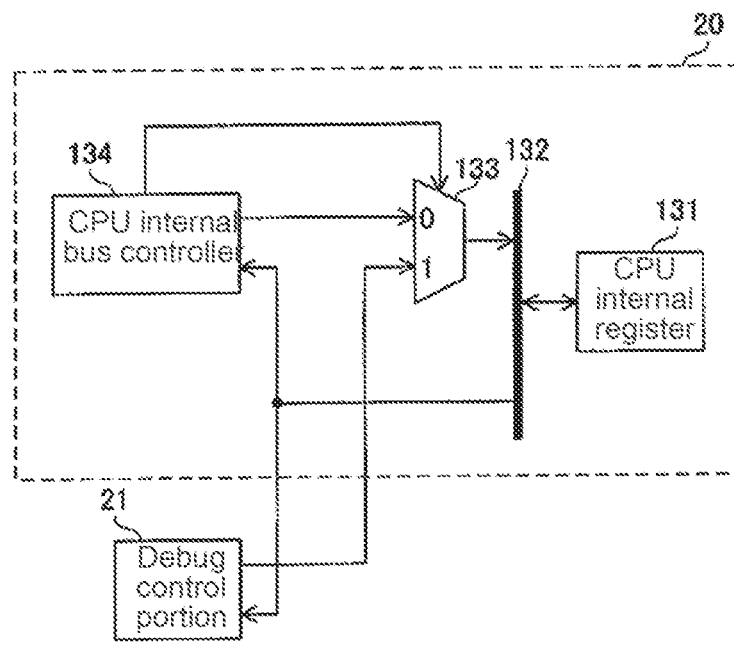
FIG. 9 is a configuration diagram of a debug control portion related to an access of an internal register of a CPU and the CPU according to the second embodiment of the present invention.

In this case, as shown in FIG. 9, a CPU internal register 131, a CPU internal bus 132, a CPU internal selector 133 and a CPU internal bus controller 134 are provided in advance in the CPU 20, and the CPU internal register 131, the CPU internal bus 132, the CPU internal selector 133 and the CPU internal bus controller 134 are respectively regarded as the storage portion 30, the internal bus 22, the selector 27 and the CPU 20 in the first embodiment to thereby realize the connection and operations identical to those of the first embodiment.

Embodiment EX2_3

The embodiment EX2_3 is described below. In the configuration in FIG. 1, the CPU 20 is an example of a processing portion that accesses the internal bus 22. However, in the present invention, such processing portion is not limited to being a CPU, and any portion accessing the internal bus 22 may become the processing portion.

Embodiment EX2_4

The embodiment EX2_4 described below. The circuit components forming the LSI 11 are formed by way of a semiconductor integrated circuit, and a semiconductor apparatus is formed by packaging the semiconductor integrated circuit in a housing (a package) made of resin. However, a circuit equivalent to the circuits in the LSI 11 may also be formed by a plurality of discrete parts.

Embodiment EX2_5

The embodiment EX2_5 is described below. A debug system of the present invention includes the semiconductor apparatus exemplified by the LSI 11, and an external device connected to the semiconductor apparatus. Herein, the configuration of the external device in FIG. 1 may be understood as the external debug device 12 or may be understood as including both the external debug device 12 and the host PC 13.

Variation modification within the range of the technical concept of the claims may be appropriately made to the embodiments of the present invention. The embodiments described above are merely examples of the embodiments of the present invention, and meanings of the terms of the present invention or the constituting components are not limited to the meanings recited in the embodiments described above. The specific values given in the description above are merely examples and may be modified to various other values.

What is claimed is:

1. A semiconductor apparatus, comprising:
   a bus;
   a storage portion, connected to the bus;
   a selector, connected to the bus, wherein the selector includes a first input portion, a second input portion and an output portion;
   a processing portion operable to execute a program, and access the bus through the selector; and
   a debug control portion, operable to mutually communicate with a host computer through an external device, and access the bus through the selector;
   wherein the host computer includes debug software to issue a predetermined command to the debug control portion through the external device, and the debug control portion is configured to output, in response to receiving the predetermined command, a debugger access start signal to the processing portion, wherein the selector selectively connects either to the first input portion or the second input portion to the output portion, and wherein the selector selects either a first select state or a second select state according to a select control signal from the processing portion without involvement of any bus arbitrator, and wherein the first select state is transmitting a first signal from the processing portion to the internal bus through the output portion, and the second select state is transmitting a second signal from the debug control portion to the internal bus through the output portion;
   when the selector is in the first select state and the debug control portion receives the predetermined command from the external device, the selector is temporarily switched to the second select state with collaboration of the debug control portion and the processing portion; and
   when the selector is set to the second select state, the debug control portion accesses the bus through the selector in response to the predetermined command, wherein, during an entirety of the second select state, the processing portion stops fetching commands and accessing the storage location, and execution of the program is suspended.

2. The semiconductor apparatus according to claim 1, wherein upon start of execution of the program, apart from temporarily setting the selector to the second select state in response to receiving of the predetermined command, the selector is set to the first select state.

3. The semiconductor apparatus according to claim 1, wherein, during the entire period of the second select state, the bus is accessible only by the debug control portion.

4. The semiconductor apparatus according to claim 1, wherein the debug control portion is operable to output a predetermined access start signal to the processing portion in response to receiving of the predetermined command, and the processing portion is operable to switch the selector from the first select state to the second select state in response to input of the access start signal; and
   upon an end of an access corresponding to the predetermined command and performed by the debug control portion, the debug control portion is operable to output a predetermined access end signal to the processing portion, and the processing portion is operable to restore the selector from the second select state to the first select state in response to input of the access end signal.

5. The semiconductor apparatus according to claim 4, wherein the processing portion comprises:
   a state machine, is operable to control an execution state of the program; when the state machine is in a fetch state of performing fetch and execution of a command forming the program, the state machine is operable to change, upon receiving the input of the access start signal by the processing portion, to a break state of suspending the fetch and execution of the command, and the state machine is operable to restore to the fetch state in response to the input of the access end signal received by the processing portion; and
   the state machine in the break state is operable to control the selector to be in the second select state.

6. The semiconductor apparatus according to claim 1, wherein when the selector is in the first select state, upon receiving a read command as the predetermined command by the debug control portion, the selector is operable to be temporarily switched to the second select state with the collaboration of the debug control portion and the processing portion; and
   when the selector is set to the second select state, the debug control portion is operable to perform a read access corresponding to the read command on the bus through the selector, and send read data acquired from the storage portion by the read access to the external device.

7. The semiconductor apparatus according to claim 6, wherein the storage portion comprises a plurality of storage regions allocated with a plurality of addresses, and any of the plurality of addresses is specified by the read command; and
   in the read access corresponding to the read command, the debug control portion is operable to access the bus through the selector to acquire data in the storage region at the address specified by the read command from the storage portion, as the read data, and send the acquired read data to the external device.

8. The semiconductor apparatus according to claim 1, wherein when the selector is in the first select state, upon receiving a write command as the predetermined command by the debug control portion, the selector is operable to be temporarily switched to the second select state with the collaboration of the debug control portion and the processing portion; and when the selector is set to the second select state, the debug control portion is operable to perform a write access corresponding to the write command on the bus through the selector, and write data corresponding to the write command to the storage portion by the write access.

9. The semiconductor apparatus according to claim 8, wherein the storage portion comprises a plurality of storage regions allocated with a plurality of addresses, and any of the plurality of addresses and write data are specified by the write command; and in the write access corresponding to the write command, the debug control portion is operable to access the bus through the selector to write the write data to the storage region at the address specified by the write command.

10. A debug system, comprising:

a semiconductor apparatus according to claim 1; and an external device, connected to the semiconductor apparatus, operable to send the predetermined command to the debug control portion of the semiconductor apparatus.

* * * * *